United States Patent [19]

Kay et al.

[11] Patent Number: 4,699,968

[45] Date of Patent: Oct. 13, 1987

[54] WATER AS A PARTIAL EXTENDER IN POLYURETHANE FORMULATIONS

[75] Inventors: Edward L. Kay, Akron; Kenneth B. Roskos, Clinton, both of Ohio

[73] Assignee: The Firestone Tire & Rubber Company, Akron, Ohio

[21] Appl. No.: 853,523

[22] Filed: Apr. 18, 1986

[51] Int. Cl.$^4$ ............................................. C08G 18/10
[52] U.S. Cl. ............................... 528/61; 528/64; 528/65
[58] Field of Search ................................ 528/61, 64, 65

[56] References Cited

U.S. PATENT DOCUMENTS 4,108,842  8/1978  Konig et al. .......................... 528/64

Primary Examiner—Maurice J. Welsh
Attorney, Agent, or Firm—D. N. Hall

[57] ABSTRACT

Urethane elastomers are produced by reacting a prepolymer with a chain extender or cure agent in the presence of limited amounts of water without adverse effects on the physical properties of the cured polyurethane.

19 Claims, No Drawings

WATER AS A PARTIAL EXTENDER IN POLYURETHANE FORMULATIONS

TECHNICAL FIELD

The present invention relates to utilizing water in association with a curing or chain extending agent during chain extension and curing of a urethane prepolymer. More specifically, it relates to utilizing a limited amount of water which is miscible with a chain extension or curing agent during extension of the urethane prepolymer.

BACKGROUND OF THE INVENTION

Heretofore, the use of water has been avoided in urethane cure systems employed in the production of elastomeric urethane articles such as cast tires, conveyor belts and in general for all molded polyurethanes requiring high strength since water was considered to be detrimental to the cured product; that is, it was believed the physical properties of the cured polyurethane would be generally poor if water was present. Water can be used in foamed urethane products to generate $CO_2$ which aids in the foaming of the product.

SUMMARY OF THE INVENTION

Accordingly, it is an aspect of the present invention to employ water in association with a chain extension agent during cure of urethane prepolymers used to form solid or high density urethane systems.

In general, a urethane composition of this invention comprises the reaction product of (A) a urethane prepolymer and (B) a water miscible chain extender and a limited amount of water which is miscible with said chain extender.

DETAILED DESCRIPTION OF PREFERRED EMBODIMENTS

Water is utilized as a partial replacement of a chain extension agent in the curing of a urethane formulation. Unexpectedly, no adverse effects on various physical properties such as low strain modulus of the cured polyurethane are noted.

The urethane prepolymers of this invention are prepared according to any conventional reaction of an active hydrogen intermediate and a polyisocyanate. The active hydrogen intermediate polymers usually contain hydroxyl and/or amine end groups and are typically characterized by two or more hydroxyl and/or amine end groups with regard to each individual polymer molecule. Desirably, the hydroxyl and/or amine functions are limited to two per molecule. Although various types of intermediates can be utilized such as a polyester, a polyether, or a mixed polyester-polyamide, a polyether intermediate is generally desired. Such an intermediate has a repeating unit (—O—R—) wherein R is from about 2 to about 10 carbon atoms and preferably from about 2 to about 6 carbon atoms. R can be aliphatic, aromatic, or combinations thereof with alkylene being preferred. Examples of specific polyether type active hydrogen urethane intermediates include poly(oxyethylene)diol, poly(oxypropylene)diol, poly(oxybutylene)diol as well their respective triols.

The intermediate is then reacted with a polyisocyanate to form the prepolymer. Suitable polyisocyanates include those having the formula $R'-(N=C=O)_n$, where $R'$ can be an aliphatic group containing from about 2 to about 20 carbon atoms, a cycloaliphatic group containing from 4 to about 20 carbon atoms, an aromatic group containing from 6 to about 20 carbon atoms, or combinations thereof, as for example, alkyl-substituted aromatics. Desirably $R'$ is an aromatic or an alkyl-substituted aromatic group having from 6 to 14 carbon atoms. The number of isocyanate units, that is "n" is an integer such as 2, 3 or higher with 2 being highly preferred. Accordingly, the term "diisocyanate" will be used hereinafter although it is to be understood that higher polyisocyanates (such as triisocyanates) can also be used. Examples of diisocyanates include the following as well as isomers thereof; diphenyl diisocyanates; 2,4,4'-triisocyanate diphenyl ether; triphenylmethane triisocyanate; benzene-1,2,4-triisocyanate; naphthalene-1,3,7-triisocyanate and the like. Highly preferred polyisocyanates include meta or para-phenylene diisocyanate; diphenylmethane diisocyanates; bitolylene diisocyanates; dianisidine diisocyanates; isophorone diisocyanates; toluene diisocyanates; hexamethylene diisocyanate; pentamethylene diisocyanate; and MDI; that is 4,4-diphenylmethane diisocyante, a preferred diisocyanate.

Desirably, an excess amount of the diisocyanate is utilized in preparing the prepolymer and such results in the existence of free diisocyanate. The amount of such free diisocyanate is generally expressed as "free isocyanate" (NCO) as a weight percent of the prepolymer. An amount of diisocyanate is utilized such that from about 1.0 to about 20%, desirably from about 4 to about 16% and preferably from about 8 to 12% free isocyanate (NCO) groups exist based upon the total weight of the prepolymer.

The preparation of the prepolymer can be in accordance with any conventional manner or procedure well known to the art. As a specific example, molten MDI at approximately 40° C. is added to the active hydrogen intermediate and the mixture then heated under a vacuum (less than 5 torr) for approximately 30 minutes at 100° to about 110° C. The solution is cooled and stored under an anhydrous nitrogen atmosphere at approximately 40° C. The intermediate prior to reaction with the molten MDI is generally heated at about 30° C. under vacuum (less than 5 torr) for several hours to ensure removal of water. Another suitable method for preparing the prepolymer is to add the MDI at 70° C. to the active hydrogen intermediate and heat the reaction mixture for approximately two hours at approximately 70° C. The prepolymer can then be stored under anydrous nitrogen at approximately 40° C. until needed.

The amount of the MDI added to the intermediate was calculated as follows:

(1) Based on the hydroxyl (amine) number of the intermediate, the number of moles of hydroxyl (amine) function was calculated;
(2) The moles of hydroxyl (amine) function were converted to weight of the diisocyanate in a ratio of [OH] or (amine/diisocyanate);
(3) The weight of diisocyanate required to obtain a desired level of "free NCO" (the amount of NCO function that theoretically would not have reacted during the prepolymer formation reaction) was calculated.
(4) The weight of diisocyanate calculated in items (2) and (3) was the total amount of diisocyanate used in the prepolymer reaction.

Prepolymers prepared by these general procedures are usually clear colorless liquids. Viscosities of the prepolymers generally depend upon the level of "free NCO" used. Generally, the formation of the prepolymer is carried out at a conventional temperature such as from about 25° C. to about 180° C.

Once the prepolymers have been made, chain extension and curing can be effected by adding a suitable amount of a chain extending curing agent thereto. The chain extending curing agents are usually highly polar compounds. Desirably they include low molecular weight polyols and/or amines having from about 2 to about 15 carbon atoms and preferably from about 4 to about 8 carbon atoms. Alkyl, aromatic or alkyl substituted aromatic polyol and/or amine compounds are used to advantage. Examples of specific polyols include ethylene glycol, 1,3-propanediol, 2-methyl-1,3-propanediol, 1,4-butanediol, and the like. The various amine analogs of the above noted polyols can also be used such as ethylene diamine as well as mixed amine-/ols such as ethanol amine, 3-aminopropanol and the like. Aromatic amines and alkyl-substituted aromatic amines having from 6 to 15 carbon atoms such as o, m, or p-phenylenediamine, aminophenols such as o, m, or p-aminophenol and the like can also be utilized. The various alkyl polyols and/or amines are preferred. It is a desirable aspect of the present invention that the chain extender or curing agent be largely or substantially soluble with the water and preferably be completely miscible therewith in the amounts utilized.

The chain extender is generally stored under essentially anhydrous conditions to be sure that it is essentially free from water. That is, the chain extender generally contains less than 0.01% by weight of water based upon the total weight of said chain extender. In the embodiment of this invention requiring water, a desired level of water is added to the essentially anhydrous chain extender to ensure that the correct amount of water is present in the mixed extender. Alternatively, the amount of water present in the extender can be determined and then adjusted or supplemented to give the desired, limited amount of water.

According to the present invention, it has been surprisingly found that significant albeit limited amounts of water can be utilized in association with the chain extender/curing agent and yet not have any adverse effects upon the physical properties of the cured polyurethanes. By the term "limited" is meant that the amount of water is usually from about 0.1% to about 15 mole %, more often 1% to 10%; desirably from about 1% to about 8% and preferably from about 1.0% to about 5.0 mole % based upon the total weight of said chain extender and said water. While not being limited to theory, it is postulated that the water does not produce any adverse effects because the initial urethane formed by the reaction of water with an ioscyanate function is relatively stable under the reaction conditions, or that because of the rapid increase in viscosity during chain extension, subsequent reactions are diffusion controlled and any adverse reactions are thereby minimized.

In any event, the amount of water and chain extending or curing agent used is such that the equivalent OH/NCO ratio is from about 0.8 to about 1.2, desirably from about 0.95 to about 1.05 and preferably about 1.0. In calculating this ratio, the water is treated as having two OH groups. Should an amine chain extender be utilized, or mixtures thereof, the equivalent ratio is the same.

Typically, the chain extension reaction can occur at a temperature of from about ambient (e.g. 25° C.) up to the boiling point of the chain extending mixture such as about 100° C. with temperatures from about 30° C. to about 70° C. being preferred. Curing, which is merely further chain extension until a suitable product is obtained, is carried out at a slightly higher temperature such as from about 100° C. to about 200° C. with from about 130° C. to about 160° C. being preferred and under pressure of about 10 to 15 tons gauge.

The invention will be better understood with reference to the following examples wherein various conventional plasticizers can be utilized.

Chain Extension/Cure Conditions

The polyurethane prepolymer was degassed under vacuum (<5 torr) and then the chain extender (either anhydrous 1,4-butanediol or a mixed extender of water/butanediol-1,4) was added at 40° C. The extender/prepolymer was rapidly mixed and degassed under vacuum (<5 torr) for about two minutes to ensure a uniform blend as well as to minimize any volatilization of water. The reaction mixture was then poured into a 6"×6"×0.075" steel mold preheated to 140° C. which was then immediately covered with a steel plate and the mold placed in a Wabash hydraulic press and the charge cured for 30 minutes at 140° C. under 10 to 15 tons gauge pressure.

Physical Testing

The stress/strain values were obtained on an Instron Test Machine using test procedures generally accepted in the rubber and plastics industries.

TABLE I

Identification of Polyols And Reagents

Voranol 4702, a product of Dow Chemical identified as a poly(oxypropylene)triol; 5000 nominal molecular weight.

Voranol 5148, a product of Dow Chemical identified as a poly(oxypropylene)triol having approximately 20% poly(oxyethylene) glycol endblock; 7000 nominal molecular weight.

MDI: 4,4'-diphenylmethane diisocyanate; a product of UpJohn Chemical.

BDO: butanediol-1,4; a product of DuPont Chemical.

TOP: tris(2-ethylhexyl)phosphate; a product of C P Hall Co. (a plasticizer).

The following Tables II and IV summarize first the ratio of extender and water used and then the physical properties (typically the modulus) of the polyurethane produced.

TABLE II

Effect of Water as Partial Extender

| | Voranol 5148 MDI Prepolymer 12.0% Free NCO | |
|---|---|---|
| Experiment No. | 1 | 2 |
| Wt. % Extender Used | | |
| BDO | 100.00 | 99.60 |
| H$_2$O | — | .40 |
| 5% Modulus, psi, at | | |
| 25° C. | 510 | 590 |
| 100° C. | 400 | 380 |

TABLE III

Water as Partial Extender
Variation of Amount of Water

Voranol 5148 MDI Prepolymer
12.0% Free NCO, OH/NCO = 1.00

| Experiment No. | 3 | 4 | 5 | 6 | 7 |
|---|---|---|---|---|---|
| Mole % of Extender | | | | | |
| BDO | 100.00 | 98.75 | 97.50 | 95.00 | 90.00 |
| H$_2$O | — | 1.25 | 2.50 | 5.00 | 10.00 |
| 5% Modulus, psi, at | | | | | |
| 25° C. | 510 | 500 | 520 | 500 | 500 |
| 100° C. | 400 | 380 | 420 | 420 | 400 |

TABLE IV

Effect of Water as Partial Extender
In a Plasticized Polyurethane Formulation

Voranol 5148 MDI Prepolymer
12.0% Free NCO, OH/NCO = 1.00

| Experiment No. | 8 | 9 | 10 | 11 |
|---|---|---|---|---|
| Mole % of Extender | | | | |
| BDO | 100.00 | 100.00 | 95.0 | 95.0 |
| H$_2$O | — | — | 5.0 | 5.0 |
| TOP Plasticizer; Parts/100 Parts Prepolymer | 2.5 | 5.0 | 2.5 | 5.0 |
| 5% Modulus, psi, at | | | | |
| 25° C. | 470 | 360 | 470 | 360 |
| 100° C. | 360 | 290 | 380 | 280 |

TABLE V

Effect of Stoichiometric OH/NCO Ratio
On Low Strain Modulii

Voranol MDI Prepolymers
12.0% Free NCO

| | Voranol 4702 | | | Voranol 5148 | | |
|---|---|---|---|---|---|---|
| Experiment No. | 12 | 13 | 14 | 15 | 16 | 17 |
| OH/NCO | 0.95 | 1.00 | 1.05 | 0.95 | 1.00 | 1.05 |
| 5% Modulus, psi, at | | | | | | |
| 25° C. | 750 | 645 | 620 | 810 | 680 | 640 |
| 100° C. | 680 | 465 | 430 | 560 | 500 | 420 |

TABLE VI

Extensive Test Data on Polyurethane
Prepared with BDO/H$_2$O Extender

Voranol 5148 MDI Prepolymer
12.0% Free NCO, OH/NCO = 1.00

| Experiment No. | 18 | 19 |
|---|---|---|
| Mole % of Extender | | |
| BDO | 100.0 | 95.0 |
| H$_2$O | — | 5.0 |
| Shore A Hardness | 95 | 95 |
| Tests at 25° C. | | |
| Modulus, psi, at % Strain | | |
| 5 | 520 | 560 |
| 50 | 1230 | 1301 |
| 100 | 1587 | 1632 |
| 200 | 2140 | 2217 |
| 300 | 2789 | 2806 |
| Tensile, psi | 2892 | 3156 |
| % Elongation at Break | 321 | 352 |
| Tests at 100° C. | | |
| Modulus, psi, at % Strain | | |
| 5 | 430 | 420 |
| 50 | 915 | 903 |
| 100 | 1120 | 1088 |
| 200 | 1424 | 1345 |
| Tensile, psi | 1446 | 1312 |
| % Elongation at Break | 211 | 182 |

Discussion of Experimental Results

In an initial attempt to determine the effect of water on the important property of low strain modulus (5% strain), the water was added to essentially anhydrous BDO extender; specifically, 0.40 weight percent water as reported in Table II. The BDO/water solution was then used as an extender for a polyurethane prepolymer. The control (experiment No. 1) utilized essentially anhydrous BDO (BDO stored over 3 angstrom molecular sieves dessicant). The amount of 99.60 BDO/0.40 wt. percent water used was the calculated theoretical amount of BDO (anhydrous) to supply sufficient hydroxyl functions to realize an overall stoichiometry of OH/NCO=1.00. Since the molecular weight of water is less than that of BDO, the actual stoichiometry was somewhat greater than 1.00. As shown in Table II, the polyurethane prepared with the BDO/H$_2$O solution had comparable 5% modulii to that of the control (experiment No. 1).

The results of experiments Nos. 1 and 2 indicated that a small amount of water in the extender is not detrimental relative to attainment of a desired 5% modulus value. From a practical standpoint, the conventional procedures of using essentially anhydrous chain extenders as well as esentially anhydrous polyols is not required; thus, processing costs associated with attainment of essentially anhydrous extenders and polyols may be eliminated. In addition, any amount of water that can be utilized as a partial replacement of extender represents a savings in raw material costs.

The next series of experiments were designed to establish the approximate maximum amount of water that could be used as a partial replacement of the BDO extender (Table III).

As shown in Table III, the amount of water was varied from 1.25 mole % to 10.0 mole %. It emphasizes that the mole % water represents the mole % of total extender required to obtain an overall stoichiometry of OH/NCO=1.00 assuming that water has a functionality of two and assuming that the initially formed urethane reacts with another NCO function without formation of CO$_2$. The remaining mole % of required extender is supplied by BDO.

Interpretation of the experimental results in Table III indicates that 10.0 mole % BDO extender can be replaced by water without adverse effect on 5% modulii. This result is unexpected especially in view of the fact that the cured polyurethane test samples did not contain voids. Void "bubbles" were expected based on the decomposition of urethane to form CO$_2$ and an amine function.

An attempt to increase the solubility of the BDO/H$_2$O extender in the prepolymer was made by adding a polar plasticizer to the prepolymer; specifically TOP, tris(2-ethylhexyl)phosphate at 2.5 parts and 5.0 parts by weight per 100 parts of prepolymer. Low strain modulii on these experimental formulations as well as appropriate controls are recorded in Table IV.

As shown by the test data in Table IV, the experimental formulations containing 5.0 mole % water (experiment Nos. 10 and 11) had 5% modulii values essentially equivalent to the controls which were essentially anhydrous.

As discussed under the "Experimental Procedures" section, reasonable precautions were taken to ensure that the water charged as a partial replacement of the BDO extender remained in the reaction mixture and entered into the chain extension reaction. If the water was removed from the reaction mixture during processing, the 5% modulii values would be expected to be significantly higher than the observed values because the stoichiometric ratio of OH/NCO would be somewhat less than 1.00. Experimental verification of higher 5% modulii at lower OH/NCO ratios is summarized in Table V. As shown, the 5% modulii values of the polyurethanes based on an OH/NCO of 0.95 were all higher than comparable values obtained at stoichiometric ratios of 1.00 and 1.05. This increase in modulii values for the polyurethanes prepared at OH/NCO=0.95 is believed due to a subsequent reaction of the excess NCO to form allophonate functions. The results on the two Voranols is reported to show that the increase in 5% modulii with lower OH/NCO ratios is a general observation.

Overall, the experimental data presented thus far indicate that at least 10 mole % water or higher can be used to replace an equivalent mole % of the BDO extender without a significant change of low strain modulii. Potentially, the 10 mole % replacement of BDO by water (equivalent to about 2.0 wt. %) could represent a significant raw materials savings in a large volume polyurethane product. The energy requirements for preparing essentially anhydrous polyols and extenders would also be eliminated.

More detailed stress/strain data on an experimental urethane formulation using BDO/water as an extender is presented in Table VI along with data from an appropriate control. The experimental formulation (Experiment No. 19) utilized 5 mole % of the total required extender as water. Inspection of the experimental data indicates that the physical properties of the control (Experiment No. 18) and the experimental formulation are essentially equivalent within experimental error.

The urethanes prepared according to the present invention can be used in cast tires, conveyor belts, and the like.

While in accordance with the patent statutes, a best mode and preferred embodiment has been set forth, the scope of the invention is not limited thereto, but rather by the scope of the attached claims.

What is claimed is:

1. A urethane composition comprising:
   the reaction product of (A) a urethane prepolymer and (B) a chain extender and from about 0.1 mole percent to about 15 mole percent of water based upon the total moles of said water and said chain extender, said water being miscible with said chain extender, and wherein said chain extender is an alkyl, an aromatic, or an alkyl substituted aromatic polyol having from 2 to 15 carbon atoms, or a mixed amine/polyol having from 2 to 15 carbon atoms.

2. A urethane composition according to claim 1, wherein the amount of water is from about 1.0 to about 10 mole percent.

3. A urethane composition according to claim 2, wherein said prepolymer contains an excess of a polyisocyanate therein, and wherein said excess is from about 1% to about 20% by weight of free (NCO) based upon the total weight of said prepolymer.

4. A urethane composition according to claim 3, wherein said prepolymer is made from a polyether intermediate having —(OR—) repeating units wherein said R is an aliphatic, aromatic or combinations thereof having from 2 to about 10 carbon atoms, and wherein said chain extender is an alkyl polyol having from 4 to 8 carbon atoms.

5. A urethane composition according to claim 4, wherein the amount of said excess polyisocyanate is from about 4% to about 16% by weight of free (NCO).

6. A urethane composition according to claim 5, wherein said polyether intermediate is poly(oxyethylene)diol, poly(oxypropylene)diol, poly(oxybutylene)diol, poly(oxyethylene)triol, poly(oxypropylene)triol or poly(oxybutylene)triol.

7. A urethane composition according to claim 6 wherein said polyisocyanate is 4,4'-diphenylmethane diisocyanate, wherein said polyether intermediate is poly(oxypropylene)triol, and wherein said chain extender is 1,4-butanediol.

8. A urethane composition according to claim 7, wherein the amount of water is from about 1 to about 5 mole percent, and wherein said excess polyisocyanate is from about 8% to about 12% by weight of free (NCO).

9. A urethane composition according to claim 1, wherein said reaction is carried out at a temperature of from about 25° C. to about 100° C.

10. A urethane composition according to claim 4, wherein said reaction is carried out at a temperature of from about 25° C. to about 100° C.

11. A urethane composition according to claim 7, wherein said reaction is carried out at a temperature of from about 25° C. to about 100° C.

12. A urethane composition according to claim 1, wherein said urethane reaction product is cured.

13. A urethane composition according to claim 4, wherein said urethane reaction product is cured.

14. A urethane composition according to claim 7, wherein said urethane reaction product is cured.

15. A urethane composition according to claim 11, wherein said urethane reaction product is cured.

16. A urethane composition according to claim 1, wherein said urethane reaction product contains a plasticizer.

17. A urethane composition according to claim 7, wherein said urethane reaction product contains a plasticizer.

18. A process for preparing a urethane composition, comprising the steps of:
   forming a mixture of water and a chain extension agent, said mixture containing from about 0.1 to about 15 mole percent of water based upon the total moles of said water and said chain extension agent, said chain extension agent being an alkyl, an aromatic, or an alkyl substituted aromatic polyol having from 2 to 15 carbon atoms;
   adding said chain extension agent-water mixture to a urethane prepolymer containing excess polyisocyanate therein; and
   chain extending and curing said prepolymer to form the urethane composition.

19. A process according to claim 18, wherein said chain extension agent is an alkyl polyol having from 4 to 8 carbon atoms, wherein said excess of polyisocyanate is from about 4% to about 16% by weight of free (NCO), wherein said polyisocyanate is 4,4'-diphenylmethane diisocyanate, wherein said prepolymer is made from polyether intermediate, wherein said polyether intermediate is poly(oxypropylene)diol or poly(oxypropylene)triol, and wherein the amount of said water is from about 0.1% to about 5.0 mole percent based upon the total number of moles of said water and said chain extension agent.

* * * * *